Dec. 27, 1966  O. J. KELLEY ETAL  3,294,045
SEED PREGERMINATING AND PLANTING PROCESS
Filed Aug. 9, 1963
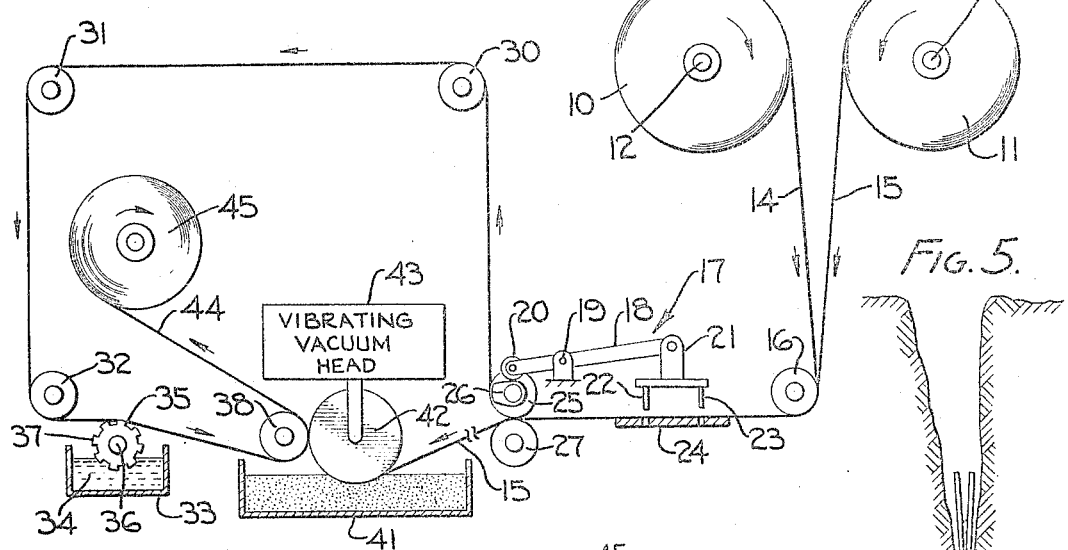
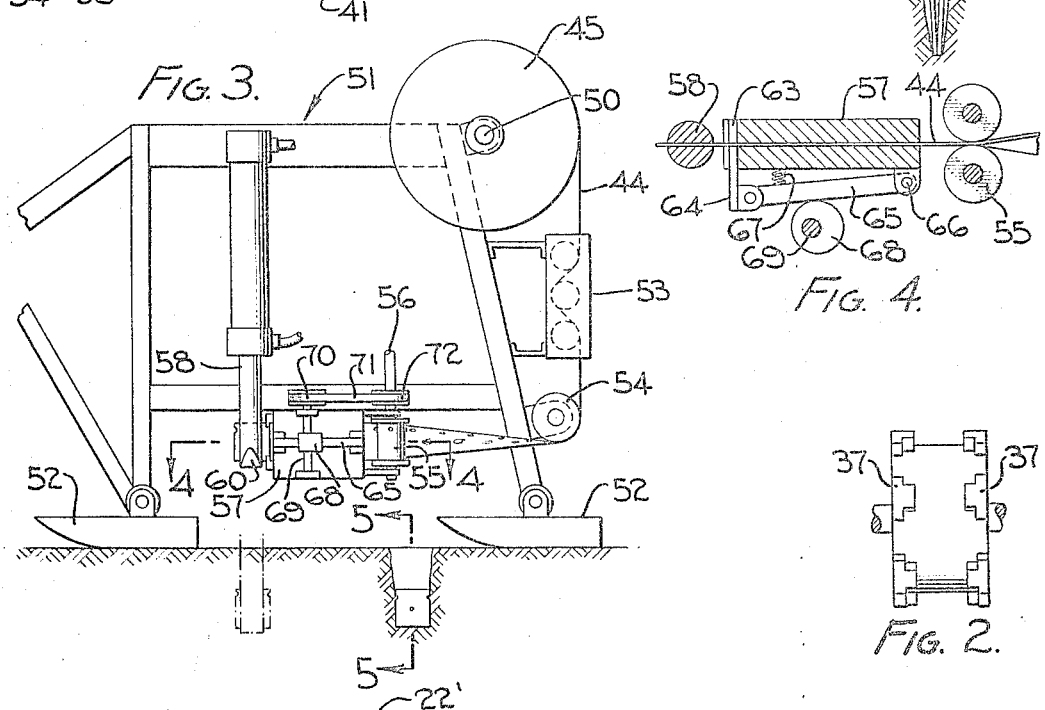
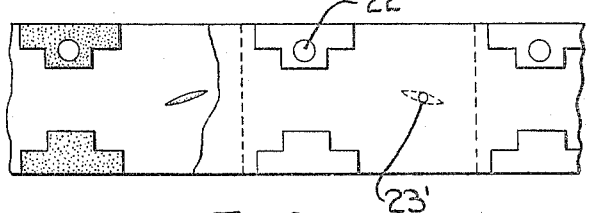
OMER J. KELLEY
WILLIAM K. MACCURDY
INVENTORS
BY *Lyon & Lyon*
ATTORNEYS.

United States Patent Office 3,294,045
Patented Dec. 27, 1966

3,294,045
SEED PREGERMINATING AND PLANTING
PROCESS
Omer J. Kelley, Altadena, and William K. MacCurdy,
Menlo Park, Calif., assignors to Stanford Research Institute, Menlo Park, Calif., a corporation of California
Filed Aug. 9, 1963, Ser. No. 301,083
12 Claims. (Cl. 111—1)

This invention relates to a process for preparing and planting seeds, and more particularly relates to a process for assembling the seeds, simultaneously pregerminating them, and individually planting them.

The most common methods of planting seeds presently used require the manual or mechanical depositing of a plurality of seeds in furrows or holes. These methods are inaccurate and result in the wastage of a great amount of seed; moreover, they require a substantial labor force both during and after the planting. For example, when seed is mechanically distributed, it is generally necessary to thin out the seedlings sprouting therefrom in order that the plants do not grow too close together and interfere with each other's proper growth. Weeds growing in the immediate vicinity of the young plants must also be manually removed. Because of the different soil conditions present in even a small area, seeds planted in this manner are often non-uniform in the time in which they germinate and thus the different plants reach maturity at different times and complicate the harvesting process.

According to the present invention, a process is provided for planting individual seeds that are all at approximately the same stage of germination at properly spaced intervals. This is accomplished by properly spacing the individual seeds along the length of two rolls of paper to form a seed tape, treating the seed tape to pregerminate all of the seeds contained therein, and tearing off and planting at the proper locations segments of the tape containing a single seed. By use of this process, the proper spacing between plants can be established and maintained while using the absolute minimum number of seeds. Since all of the seeds have been pregerminated, the sprouting of a plant from each seed should be assured and, moreover, all of the seeds are at the same stage of development so that the plants will be ready to be harvested at approximately the same time.

It is therefore an object of the present invention to provide a process for planting individual, pregerminated seeds at properly spaced locations.

It is also an object of the present invention to provide such a process wherein the seeds are affixed to a seed roll and the seed roll treated to simultaneously pregerminate the seeds.

It is another object of the present invention to provide such a process wherein the seeds are affixed to a seed roll, the seed roll treated to pregerminate the seeds, and segments of the seed roll containing a single seed planted in properly spaced locations.

These and other objects and advantages of the present invention will become more apparent upon reference to the accompanying description and drawings in which:

FIGURE 1 is a schematic illustration of apparatus suitable for forming the seed tapes of the present invention;

FIGURE 2 is a side elevation of an adhesive applicator used in the formation of the seed tape;

FIGURE 3 is a schematic illustration of apparatus useful for planting the individual segments of the seed roll;

FIGURE 4 is a cross sectional view taken along lines 4—4 of FIGURE 3;

FIGURE 5 is a view taken along lines 5—5 of FIGURE 3 showing the manner in which the seed roll segment is positioned in the ground; and FIGURE 6 is a top plan view, partly broken away, showing a section of the seed tape of the present invention.

Referring now to FIGURE 1, apparatus for forming a seed tape according to the present invention is shown. First and second reels 10 and 11 of a suitable paper are rotatably mounted on axles 12 and 13. Both the paper strip 14 from the reel 10 and the paper strip 15 from the reel 11 are passed over a common idler roller 16 to a punch, generally indicated at 17.

The punch 17 has a lever 18 pivoted on a pin 19, one end of the lever 18 having a cam follower 20 mounted thereon and the other end having a punching mechanism 21 mounted thereon. The punch mechanism 21 is provided with an index punch member 22 and a seed hole punch member 23 which cooperate with a base 24 underlying the paper strips 14 and 15. The cam follower 20 cooperates with a roller 25 which has an eccentric cam 26 mounted thereon. Rotation of the roller 25 causes the lever 18 to pivot around its fulcrum 19 and the punch members 22 and 23 to punch holes at equal increments along the strips 14 and 15. An idler roller 27 is provided immediately underneath the roller 25 to keep the strip 14 in engagement with the roller 25.

After passing the rollers 25 and 27, the strips 14 and 15 are separated. The strip 14 passes over rollers 30, 31 and 32 and is then passed to a glue pot 33 filled with a suitable liquid adhesive 34. An adhesive applicator 35 is rotatably mounted on a shaft 36 and is provided with a number of T-shaped protrusions 37 which transfer the adhesive 34 from the pot 33 to the strip 14 to form T-shaped adhesive patterns thereon. The adhesive patterned strip 14 is then passed to a roller 38 overlying a seed hopper 41.

The strip 15 has meanwhile been passed to a drum 42 which forms part of a vibrating vacuum head 43 positioned over the seed hopper 41. The air flow through the seed hole 23' in the strip 15 attracts one or more seeds to this hole. The vibration of the head 43 tends to push one seed over the hole while removing the surplus.

The strip 15 with its affixed seeds is now also passed over the roller 38 where it is covered by the strip 14 and adhered thereto by the adhesive patterns formed on the strip 14. The travel distance for each of the strips 14 and 15 from the roller 25 to the roller 38 is preferably kept equal or other conventional precautions are taken to insure even mating of the strips at the roller 38. The seed laden tape 44 thus formed is stored on the drive reel 45 for handling in pregermination and planting.

Sometime shortly before the selected planting time, the seeds confined in the seed roll or tape 44 are pregerminated. This is accomplished by preparing a nutrient solution containing suitable pesticides and fungicides determined by the nature of the seed and the expected planting conditions. The temperature of this solution is then adjusted to be most desirable for the particular seeds to be germinated. The rolled, seed laden tape is placed in the nutrient solution for a period of time required to bring the seed moisture content to a level necessary to insure germination.

After this time has elapsed, the seed laden tape 44 is removed from the solution, the excess liquid drained off, and the tape is placed in a controlled environment and subjected to an optimum temperature or temperature cycle for a period of time necessary to bring the seeds to the point where the roots are just ready to emerge from the seed coat. The seed roll with its pregerminated seeds is then held at a low temperature until the seeds are ready to be planted.

The nutrient solution constituents, the temperatures and the treatment times required for each individual variety of seed are available in the literature. As an example when Great Lakes lettuce is to be planted in low fertility soil, the nutrient solution may contain nitrogen, phosphorus, potassium and a mixture of minor elements. When aphids or thrips are present, a systemic insecticide such as phorate is added to the solution. Where Rhizoctonia is a problem, a suitable fungicide such as pentachloronitrobenzene would also be added. The temperature of this solution is adjusted to approximately 73 degrees Fahrenheit and seed roll immersed in the solution for approximately two hours. The seed roll is then removed from the solution, the excess liquid drained off and the seeds maintained at a temperature of around 73 degrees Fahrenheit for about forty-eight hours. During this time the seed roll is positioned in an atmosphere of saturated humidity.

In actual practice, the day on which it is desired to plant would be set and the above process initiated at such a time that it would be completed on that day so that the seed roll could be immediately planted. If for some reason the seeding could not be done at the set time, the pregerminated seeds may be held at a temperature of between approximately 33 degrees Fahrenheit and 40 degrees Fahrenheit for up to several days without loss of viability or without emergence of roots.

When the seeds are ready for planting, the seed roll 45 is mounted on a shaft 50 supported by a framework 51. The seed roll 45 should be kept in a saturated condition during the planting process. The framework 51 has shoes 52 which rest on the ground and locate the soil surface with reference to the remaining apparatus mounted on the framework 51 and then is passed over a roller 54, rotated approximately 90 degrees, and passed to a feed sprocket 55 which is mounted on a shaft 56 driven by any conventional drive means (not shown). The seed tape is then passed through a cutting block 57 to a reciprocating shuttle clamp 58. The shuttle clamp 58 may be pneumatically, hydraulically or electrically operated and is provided with a knife edge 60 for separating the soil and placing tape bits in single seed increments in a vertical position in the ground at a preset depth and spacing.

The cutting block 57 is provided with a lateral channel 63 in which slides a knife blade 64. The knife blade 64 is mounted on the end of an arm 65 which is pivoted at its other end on a pin 66 and is biased away from the block 57 by a spring 67. The knife blade 64 is periodically inserted all the way into the channel 63 by the action of an eccentric cam 68 mounted on a shaft 69 to sever the outer segment of the seed roll 44. The shaft 69 is provided with a pulley 70 and is driven by means of a belt 71 which cooperates with this pulley and a pulley 72 mounted on the shaft 56.

As can be seen from FIGURE 6, the action of the knife blade 64 is coordinated with the drive sprocket 55 such that the cutting line (shown in dotted lines in FIGURE 6) occurs just ahead of the adhesive patterns. This opens the tape bits so that the seed is unconfined when planted. It should be obvious that the specific method of adhering and cutting the seed tape illustrated is only a preferred embodiment and that any other suitable method may be employed. For example, it has been found that providing a thin, continuous strip of adhesive along each edge of the tape, or providing thin strips of adhesive across the tape between succeeding seeds are also satisfactory. FIGURE 5 shows the manner in which each individual seed is implanted in the ground. If desired, the rear shoe 52 may be provided with means for covering the seed with soil, fertilizer or the like.

From the foregoing description, it can be seen that a process has been provided for planting individual seeds in properly spaced positions, with good assurance that all the seeds will sprout and reach maturity at approximately the same time. The process eliminates the wastage of seeds that has heretofore been inevitable with manual or mechanical seeding and also eliminates the need for thinning in the area of the young plant, thus substantially reducing labor costs.

The invention may be embodied in other specific forms not departing from the spirit or central characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:
1. A process of preparing for planting a plurality of seeds affixed along the length of a tape comprising: immersing said seed laden tape in a nutrient solution to bring the moisture content of the seeds to a level sufficient to insure germination and to provide essential elements for growth, removing said seed laden tape from said solution and placing said seed laden tape in a controlled humidity and temperature environment until roots are just ready to emerge from the seed coat.

2. The process of claim 1 wherein said nutrient solution also contains suitable pesticides and fungicides.

3. A process of preparing for planting a plurality of seeds affixed along the length of a tape comprising: immersing said seed laden tape in a nutrient solution to bring the moisture content of the seeds to a level sufficient to insure germination and to provide essential elements for growth, removing said seed laden tape from said solution, draining off excess solution from said tape, and placing said seed laden tape in a controlled humidity and temperature environment until roots are just ready to emerge from the seed coat.

4. A process for preparing for and planting a plurality of seeds affixed at spaced locations along the length of a tape comprising: immersing said seed laden tape in a nutrient solution to bring the moisture content of the seeds to a level sufficient to insure germination and to provide essential elements for growth, removing said seed laden tape from said solution, bringing said seeds to a point where the roots are just ready to emerge from the seed coat, and inserting single seed containing increments of said tape a desired depth into the ground.

5. A process for preparing for and planting a plurality of seeds affixed at spaced locations along the length of a tape comprising: immersing said seed laden tape in a nutrient solution to bring the moisture content of the seeds to a level sufficient to insure germination and to provide essential elements for growth, removing said seed laden tape from said solution, placing said seed laden tape in a controlled humidity and temperature enviroment until roots are just ready to emerge from the seed coat, and inserting single seed containing increments of said tape a desired depth into the ground.

6. A process of planting pregerminated seeds comprising affixing individual seeds at spaced locations along the length of a tape, immersing said seed laden tape in a nutrient solution to bring the moisture content of the seeds to a level sufficient to insure germination and to provide essential elements for growth, removing said seed laden tape from said solution, draining off excess solution from said tape, placing said seed laden tape in a controlled humidity and temperature environment until roots are just ready to emerge from the seed coat, removing said seed laden tape from said environment, severing single seed containing increments of said tape from the remainder thereof, and inserting said increments a desired depth into the ground at spaced locations.

7. A process of planting pregerminated seeds comprising confining individual seeds between two elongated strips of paper at spaced locations along the length thereof to form a seed laden tape, winding said tape into a roll, immersing said rolled tape in a nutrient solution to bring the moisture content of the seeds to a level sufficient to insure germination and to provide essential elements for growth, removing said rolled tape from said solution, draining off excess solution from said rolled tape, placing said rolled tape in a controlled humidity and temperature environment until roots are just ready to emerge from the seed coat, removing said seed laden tape from said environment, severing single seed containing increments of said tape from the remainder thereof, and inserting said increments a desired depth into the ground at spaced locations.

8. The process of claim 7 wherein said nutrient solution also contains suitable pesticides and fungicides.

9. A process of preparing for planting a plurality of seeds affixed along the length of a tape comprising: applying to said seed-laden tape a nutrient solution to bring the moisture content of the seeds at least to a level sufficient to insure germination and to provide essential elements of growth, and placing said seed-laden tape in a controlled humidity and temperature environment until roots are just ready to emerge from the seed coat.

10. The process of claim 9 wherein said nutrient solution also contains suitable pesticides and fungicides.

11. A process of preparing for and planting a plurality of seeds comprising: affixing individual seeds at spaced locations along the length of a tape, applying to said seed-laden tape a nutrient solution to bring the moisture content of the seeds to a level sufficient to insure germination and to provide essential elements for growth, placing said seed-laden tape in a controlled humidity and temperature environment until roots are just ready to emerge from the seed coat and inserting single seed-containing increments of said tape a desired depth into the ground at spaced locations.

12. A process of preparing for and planting a plurality of seeds affixed at spaced locations along the length of a tape comprising: immersing said seed-laden tape in a nutrient solution to bring the moisture content of the seeds to a level sufficient to insure germination and to provide essential elements for growth, removing said seed-laden tape from said solution, draining off excess solution from said tape, placing said seed-laden tape in a controlled humidity and temperature environment until roots are just ready to emerge from the seed coat, removing said seed-laden tape from said environment, severing single seed containing increments of said tape from the remainder thereof, and inserting said increments a desired depth into the ground at spaced locations.

References Cited by the Examiner
UNITED STATES PATENTS

| | | | |
|---|---|---|---|
| 851,171 | 4/1907 | Israel | 47—56 |
| 1,735,835 | 11/1929 | McCallum | 111—1 |
| 2,006,967 | 7/1935 | Sparks. | |
| 2,932,128 | 4/1960 | Porter et al. | 47—58 |
| 3,059,437 | 10/1962 | Jennings et al. | |
| 3,130,694 | 4/1964 | Gatzke | 111—7 |
| 3,149,588 | 9/1964 | Gatzke | 111—1 |
| 3,233,366 | 2/1966 | Nutile et al. | 47—16 |

ABRAHAM G. STONE, *Primary Examiner.*

R. E. BAGWILL, *Assistant Examiner.*